(12) United States Patent
Asano et al.

(10) Patent No.: US 7,191,198 B2
(45) Date of Patent: Mar. 13, 2007

(54) STORAGE OPERATION MANAGEMENT PROGRAM AND METHOD AND A STORAGE MANAGEMENT COMPUTER

(75) Inventors: Masayasu Asano, Yokohama (JP);
Kenichi Shimooka, Yokohama (JP);
Daisuke Shinohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 306 days.

(21) Appl. No.: 10/650,851

(22) Filed: Aug. 29, 2003

(65) Prior Publication Data

US 2004/0225697 A1 Nov. 11, 2004

(30) Foreign Application Priority Data

May 8, 2003 (JP) ............................. 2003-130297

(51) Int. Cl.
*G06F 12/00* (2006.01)
*G06F 17/30* (2006.01)

(52) U.S. Cl. ...................... 707/204; 707/201; 707/200; 707/202; 707/203

(58) Field of Classification Search ................ 707/200, 707/201, 202, 203, 204
See application file for complete search history.

(56) References Cited

U.S. PATENT DOCUMENTS

| 6,681,303 | B1 | 1/2004 | Watanabe et al. | |
|---|---|---|---|---|
| 6,754,792 | B2 * | 6/2004 | Nakamura et al. | 711/162 |
| 6,922,763 | B2 * | 7/2005 | Suzuki et al. | 711/162 |
| 7,080,224 | B2 | 7/2006 | Soejima et al. | |
| 2002/0059329 | A1 * | 5/2002 | Hirashima et al. | 707/204 |
| 2002/0099914 | A1 | 7/2002 | Matsunami et al. | |
| 2003/0074528 | A1 | 4/2003 | Soejima et al. | |
| 2003/0167312 | A1 * | 9/2003 | Mori | 709/212 |
| 2003/0188114 | A1 | 10/2003 | Lubbers et al. | |
| 2003/0195903 | A1 * | 10/2003 | Manley et al. | 707/201 |
| 2003/0204597 | A1 * | 10/2003 | Arakawa et al. | 709/226 |
| 2003/0233518 | A1 * | 12/2003 | Yamagami et al. | 711/114 |
| 2004/0088379 | A1 * | 5/2004 | Aoshima et al. | 709/219 |
| 2004/0117602 | A1 * | 6/2004 | Tripathy et al. | 712/225 |
| 2004/0205310 | A1 * | 10/2004 | Yamagami | 711/162 |

FOREIGN PATENT DOCUMENTS

JP 2001-306407 11/2001

* cited by examiner

*Primary Examiner*—Frantz Coby
*Assistant Examiner*—Cindy Nguyen
(74) *Attorney, Agent, or Firm*—Mattingly, Stanger, Malur & Brundidge, P.C.

(57) ABSTRACT

A managing computer (manager) manages replication of data areas inside a storage or among storages. A storage volume management module of the manager manages policy of the volume and its properties. When replication of a volume is set, a volume of a replication destination appropriate for a volume of a replication source is generated using the policy and the properties to form a replication pair. A route management module of the manager and its volume management module bring the policy and the properties of the volumes, and the policies and conditions of lines into conformity with one another. When any fault occurs in a line route used for data transfer during replication of the volume, a separate line route is utilized, and a fault countermeasure is taken for replication of the volumes in accordance with the policy and properties of the volumes.

18 Claims, 8 Drawing Sheets

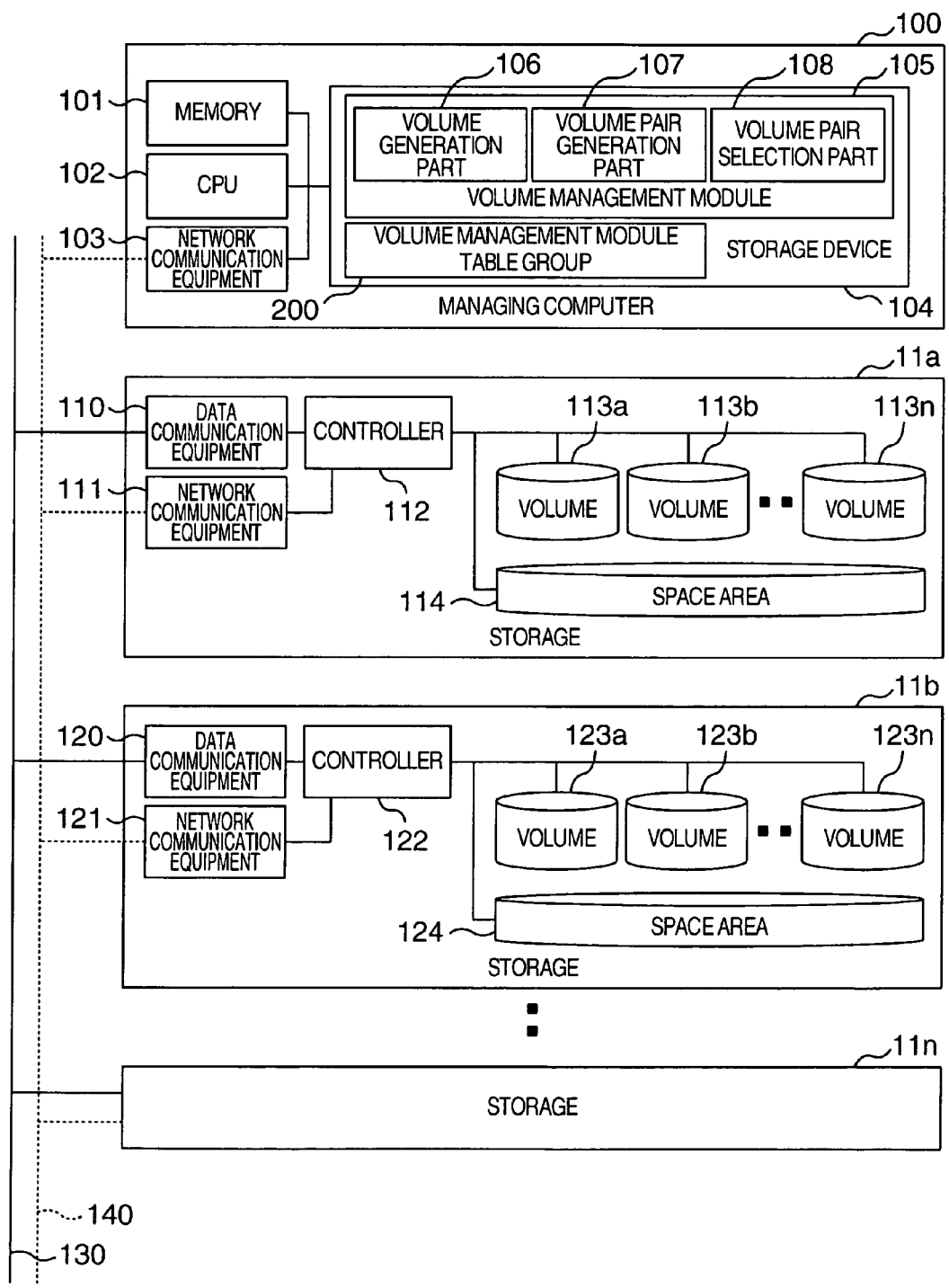

FIG. 2

210: VOLUME INFORMATION TABLE

| VOLUME ID | STORAGE ID | STORAGE VOLUME ID | POLICY | CAPACITY | READ/ WRITE | PERFORM-ANCE | RELIA-BILITY | PAIRING POSSIBLE/ IMPOSSIBLE |
|---|---|---|---|---|---|---|---|---|
| 1 | 1 | 1 | FOR REPLICATION SOURCE | 20G | 5 | 9 | 5 | IMPOSSIBLE |
| 2 | 1 | 2 | | 40G | 5 | 9 | 5 | IMPOSSIBLE |
| 3 | 1 | 3 | | 50G | 4 | 3 | 5 | POSSIBLE |
| 4 | 1 | 4 | | 20G | 5 | 9 | 5 | IMPOSSIBLE |
| 5 | 2 | 1 | | 40G | 5 | 9 | 5 | IMPOSSIBLE |
| 6 | 2 | 2 | | 50G | 4 | 5 | 5 | POSSIBLE |
| 7 | 3 | 1 | FOR REPLICATION SOURCE | 50G | 4 | 3 | 10 | POSSIBLE |

220: STORAGE INFORMATION TABLE

| STORAGE ID | SPACE CAPACITY | POLICY | RELIABILITY | MAXIMUM PERFORMANCE |
|---|---|---|---|---|
| 1 | 200G | - | 5 | 10 |
| 2 | 400G | - | 5 | 8 |
| 3 | 500G | MAIN STORAGE | 10 | 5 |
| 4 | 500G | - | 10 | 5 |

230: PAIR INFORMATION TABLE

| PAIR ID | MAIN VOLUME ID | SUB-VOLUME ID | REPLICATION TYPE |
|---|---|---|---|
| 1 | 1 | 4 | SYNCHRONOUS |
| 2 | 2 | 5 | ASYNCHRONOUS |

VOLUME MANAGEMENT MODULE TABLE GROUP

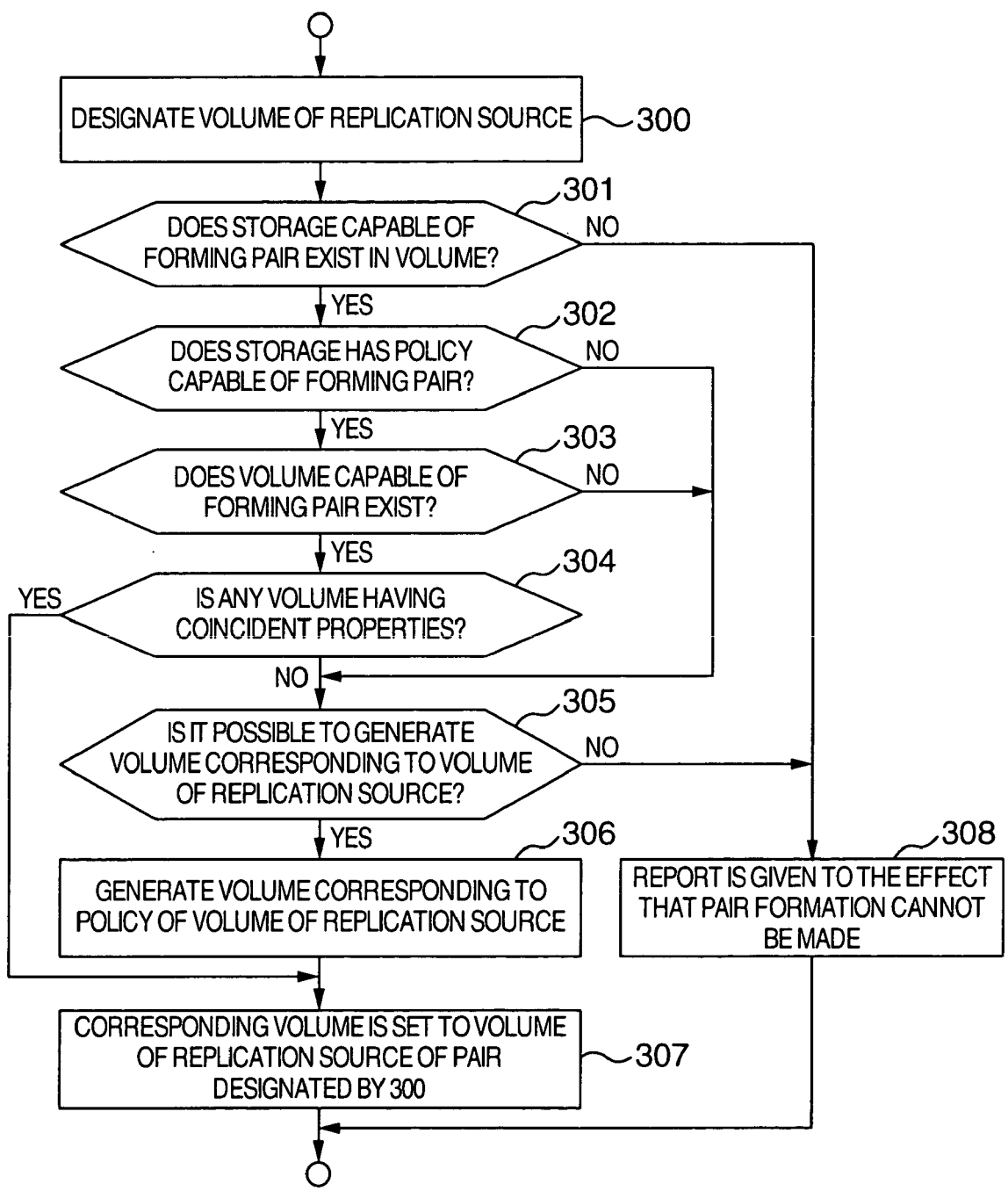

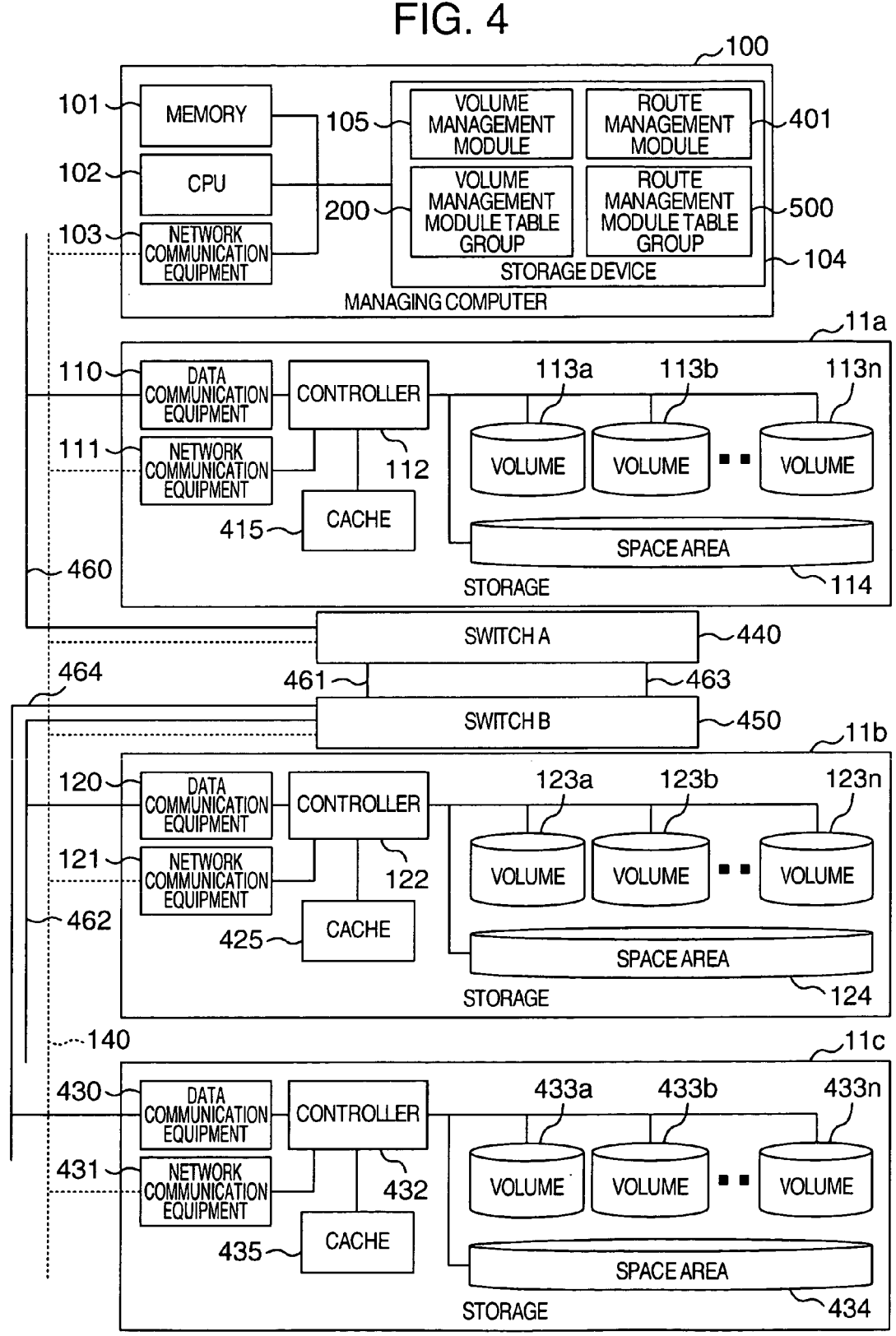

FIG. 5

510: ROUTE INFORMATION TABLE (500)

| ROUTE ID | ROUTE | CONDITION | ASSOCIATED STORAGE | ASSOCIATED PAIR | POLICY |
|---|---|---|---|---|---|
| ROUTE 1 | 460, 461, 462 | ABNORMAL | 1, 2 | 1 | HIGH SPEED |
| ROUTE 2 | 460, 463, 462 | NORMAL | 1, 2 | | LOW SPEED |
| ROUTE 3 | 460, 463, 464 | NORMAL | 1, 3 | | HIGH SPEED |
| ROUTE 4 | 462, 464 | NORMAL | 2, 3 | | HIGH SPEED |

Columns: 511 ROUTE ID, 512 ROUTE, 513 CONDITION, 514 ASSOCIATED STORAGE, 515 ASSOCIATED PAIR, 516 POLICY

520: CACHE INFORMATION TABLE

| STORAGE ID | CACHE USE RATIO |
|---|---|
| 1 | 10% |
| 2 | 50% |
| 3 | 90% |

Columns: 521, 522

ROUTE MANAGEMENT MODULE TABLE GROUP

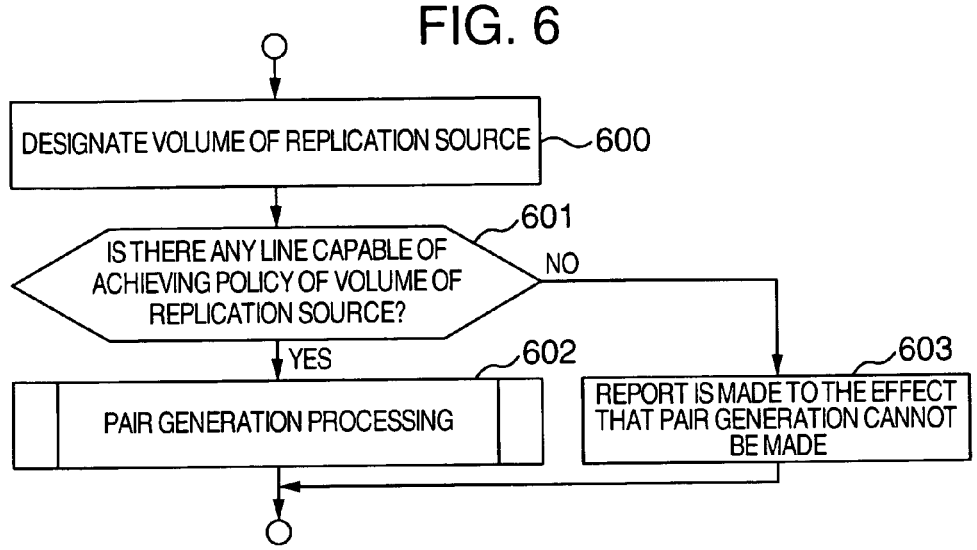
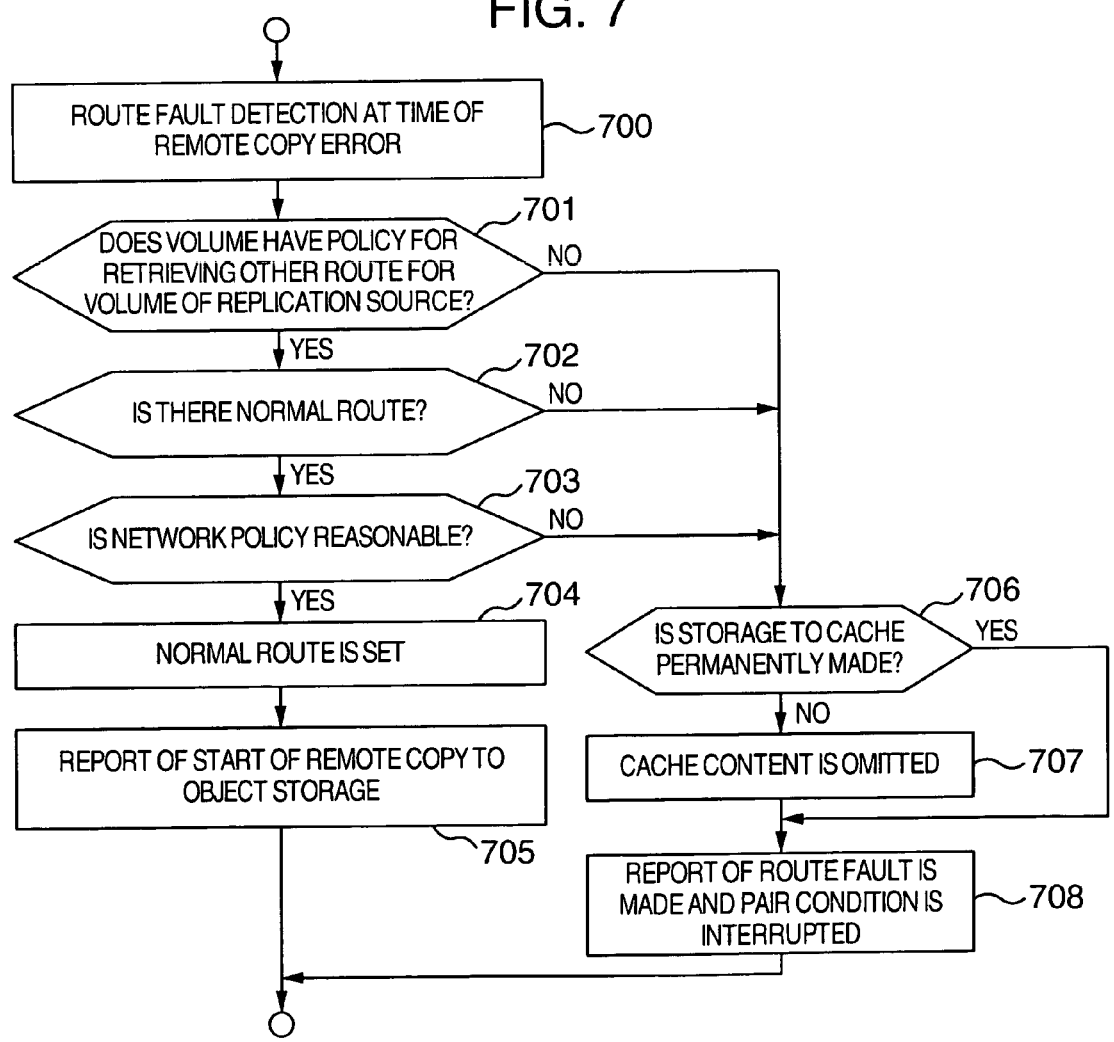

STORAGE OPERATION MANAGEMENT PROGRAM AND METHOD AND A STORAGE MANAGEMENT COMPUTER

BACKGROUND OF THE INVENTION

1. Field of the Invention

This invention relates to a storage operation management program, a storage operation management method and a storage managing computer. More particularly, the invention relates to a storage operation management program, a storage operation management method and a storage managing computer each capable of operating and managing replication of data area inside the same storage or among storages in accordance with information of the data areas of the storages.

2. Description of the Related Art

Technologies such as a snapshot function for doubling data inside a storage (e.g. JP-A-2001-306407) and a remote copy function for doubling data among storages in consideration of backup to cope with disasters are known as prior art technologies for improving versatility of computer systems and for achieving storages capable of backing up data for a non-stop operation of the computer systems.

The snapshot function is the one that makes it possible to conduct data backup on the on-line basis while continuing the business operations in a computer system that is to continuously operate for 24 hours and for 365 days without interruption.

According to the remote copy function, a storage of a computer system operating normally transfers updating data to a storage of a computer system installed and operating at a different remote place so that the data stored in the storage of the remote place can be brought substantially equivalent to the data stored in the storage of the computer system normally operating, and the loss of data can be minimized even when any accident occurs in the computer system normally operating.

To efficiently process a plurality of remote copy requests in the remote copy function, a technology is known that decides a remote copy schedule and a route of a line in consideration of access frequency of data areas and a condition of replication line.

All the prior art technologies described above are directed to reduce a processing load of a replication processing from the data area of a replication source to the data area of a replication destination and to improve transfer efficiency. In other words, these technologies are based on the premise that the data area of the replication source and the data area of the replication destination coexist.

On the other hand, the number of computer systems that use a plurality of storages connected with one another through SAN (Storage Area Network) or IP (Internet Protocol) by use of a dedicated storage network (mainly, Fibre Channel) and share data of a large capacity distributively stored in these storages has increased with the increase of the data capacity. Among the storages connected by SAN, etc, some of them are sometimes products of different manufacturers or have different performance such as an access speed. It has thus become more difficult to select, generate and designate the data area having reliability and the access speed corresponding to those of policy of users and applications such as the policy for a financial system, a policy for various management businesses for companies, a policy for databases, and so forth. A prior art technology that makes it possible to generate a data area coincident with the policy of the user is also known.

SUMMARY OF THE INVENTION

However, the prior art technologies described above do not consider generation of a data area of a replication source and a data area of a replication destination for doubling data by snapshot or remote copy.

To efficiently set data doubling in accordance with user policy from among various storages connected to SAN or IP, it becomes necessary to generate a data area of a replication destination similar to a data area of a replication source that satisfies reliability and an access speed of the user policy such as the financial system, various management businesses, databases, etc, described above and to generate a replication pair of the data areas. When any fault occurs in the replication operation for doubling data in the business such as in the financial system for which data reliability is severely required, the prior art technologies described above executes again replication after the fault is restored. It may be possible to change a route of replication from the data area of the replication source to the data area of the replication destination in data doubling. Depending on the policy of the data area and on the operation policy of data doubling as a whole, however, it is necessary to decide the operation by judging whether the route of replication is to be changed or to wait for the restoration of the fault. Consequently, it is difficult to efficiently operate the overall system.

In view of the problems described above, it is an object of the invention to provide a storage operation management program, a storage operation management method and a storage managing computer each capable of operating and managing replication of data areas inside the same storage or among storages in accordance with information of the data areas of the storages.

According to a feature of the invention, a storage operation management program for operating and managing replication of data areas inside a storage or among a plurality of storages comprises a processing step of accepting a request for generation of a data area of a replication destination for a data area of a replication source; a process step of retrieving a data area capable of becoming a replication destination coincident with properties of a data area corresponding to policy of the data area of the replication source from existing data areas; and a process step of instructing the storage to generate a replication pair of the data areas.

According to another feature of the invention, a storage operation management method for operating and managing replication of data areas inside a storage or among a plurality of storages comprises a processing step of accepting a request of generation of a data area of a replication destination for a data area of a replication source; a process step of retrieving a data area capable of becoming the replication destination coincident with properties of a data area corresponding to policy of the data area of the replication source from existing data areas; and a process step of generating a replication pair on the basis of the retrieval result.

More concretely, in an aspect of the invention, when a data area for managing and replicating policy of a data area and its properties and a data area for replication is selected, the policy and properties of a data area of a replication source are acquired, a data area of a replication destination coincident with policy and properties of the data area of the replication source is generated and a replication pair of the data areas is generated. Consequently, an operation of data doubling in accordance with the policy and properties of the data area becomes explicitly possible, and automation of setting of data doubling in accordance with the policy of the data area and data doubling can be effectively constituted from among a plurality of storages connected through SAN or IP.

In another aspect of the invention, the policy of the data area of the replication source is brought into conformity in the aspect of the operation, too. When any fault or delay of a replication process occurs in a route connecting a data area of a replication source and a data area of a replication destination in the case of remote copy, for example, judgment is made in accordance with the policy of the data area of the replication source as to whether another connectable route is set, or data to be doubled is stored in a cache inside a storage to wait for restoration of the fault of a line, or replication data having low priority is omitted. Consequently, the operation of data doubling can be effectively made.

According to the invention, the resolution method described above manages the policy of the data areas of the storages and their property, can conduct automatic setting of data doubling in accordance with the policy of the data area by utilizing the policy and can operate data doubling flexibly and explicitly for users.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing a construction of a storage operation management system according to a first embodiment of the invention;

FIG. 2 is an explanatory view useful for explaining a table group managed by a volume management module 105;

FIG. 3 is a flowchart useful for explaining a processing operation for setting replication of volumes in accordance with policy of a volume of replication source and generating a pair of the volume of the replication source and a volume of the replication destination;

FIG. 4 is a block diagram showing a construction of a storage operation management system according to a second embodiment of the invention;

FIG. 5 is an explanatory view useful for explaining a table group managed by a route management module 401;

FIG. 6 is a flowchart useful for explaining a processing operation for generating a replication in accordance with policy of a line for connecting volumes when a volume replication is generated between storages in the second embodiment of the invention;

FIG. 7 is a flowchart useful for explaining a processing operation of fault shooting when any fault occurs in a route of replication during the volume replication operation between the storages;

DETAILED DESCRIPTION OF THE EMBODIMENTS

Figure 8:
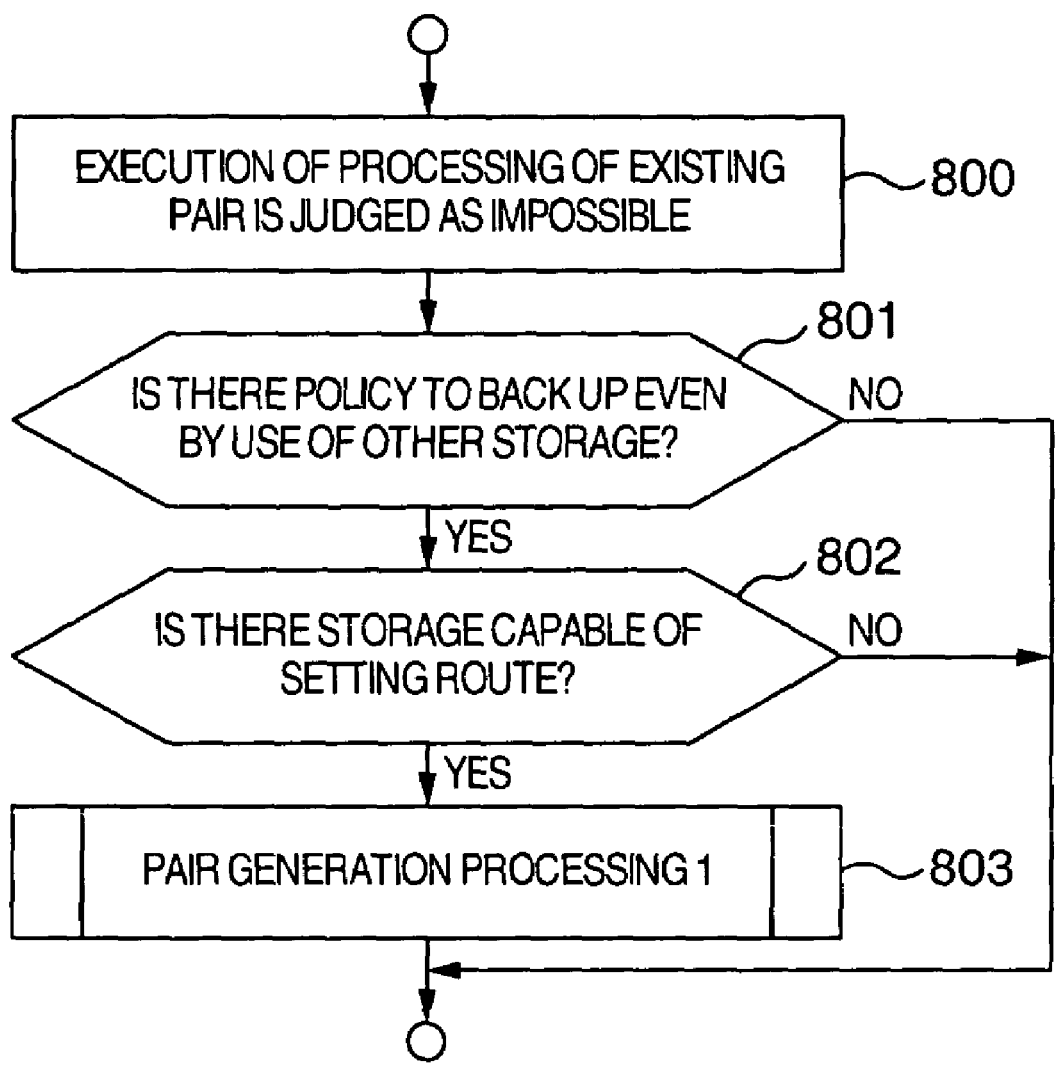
FIG. 8 is a flowchart useful for explaining a processing operation for generating a replication pair in another storage.

A construction of a storage operation management system and an operation management method according to preferred embodiments of the invention will be hereinafter explained in detail with reference to the accompanying drawings.

FIG. 1 is a block diagram showing a construction of a storage operation management system according to a first embodiment of the invention.

The storage operation management system according to the first embodiment of the invention includes a managing computer (manager) 100 and a plurality of storages 11a to 11n that are connected to one another through a data network 130 and through a network 140. The storage 11a includes volumes (data areas, hereinafter called merely "volumes") 113a, 113b, . . . , 113n as management areas for storing data that are managed in practice by a computer, a space area 114 that will be divided and set as volumes in future, data communication equipment 110 for transmitting and receiving data I/O of read/write data of the volumes, network communication equipment 111 for communicating with the managing computer 100, etc, and a controller 112 for practically controlling the storages. The data communication equipment 110 and the network communication equipment 111 may be constituted and arranged as one communication equipment by connecting them together through IP (Internet Protocol) connection in a connection form (such as Ethernet (trade mark)).

The storage 11b, too, includes volumes 123a, 123b, . . . , 123n, a space area 124, data communication equipment 120, network communication equipment 121 and a controller 122 in the same way as the storage 11a. The other storages 11b, . . . , 11n have also the same construction as the storage 11a.

The data network 130 is a cable as a route of data communication of the storages and the computers. The network 140 is a route that can communicate with the managing computer 100, etc. These networks may be either mere buses or LAN. The data network 130 and the network 140 are the same with each other depending on the communication form and may be Ethernet (trademark), for example.

The managing computer 100 includes a memory 101, a CPU 102, network communication equipment 103 and a storage device 104. The storage device 104 includes therein a volume management module 105 and a later-appearing volume management module table group 200 managed by the volume management module 105.

The volume management module 105 achieves the processing in the embodiment of the invention. The volume management module 105 includes a volume generation part 106 for instructing generation of the volumes to the storages 11a, 11b, . . . , 11n, a volume pair generation part 107 for generating a replication pair from among the volumes generated by the instruction of the volume generation part 106, and a volume pair selection part 108 for selecting the volume pair that can be replicated from policy of the volumes (for replication source, for replication destination, for both, etc) and their properties (performance, reliability, etc) and from policy of the storages (for financial systems, for various management businesses of companies, for database, etc) and their properties (performance, reliability, etc). The volume management module 105 is accomplished when software, not shown, stored in the storage device of the managing computer 100 is written into the memory 101 and is executed by the CPU 102.

When the storage operation management system shown in FIG. 1 replicates the volumes between the storages, such as when a volume 113a of the storage 11a is a volume of the replication source and the volume 123a of the storage 11b is a volume of a replication destination, the controller 112 of the storage 11a and the controller 122 of the storage 11b cooperate with each other, transmit the content of the volume 113a to the volume 123a through the data network 130 and replicate the content. In this case, the respective computers using the volume 113a and the volume 123a and the controllers 112 and 122 may cooperate with one another and conduct replication.

FIG. 2 explains the table group that the volume management module 105 manages. The volume management module table group 200 managed by the volume management module 105 includes a volume information table 210, a storage information table 220 and a pair information table 230.

The volume information table 210 stores a volume ID 211 allocated to identify all the volumes of the storages managed by the managing computer 100, a storage ID 212 representing an identifier of the storage to which the volume belongs, a storage volume ID 213 representing the identifier of the volume managed inside each storage in the storage, a policy 214 representing the use policy of the volume such as for the replication source, for the replication destination, for both replication source and destination, for the replication source for remote copy, each being designated by the user and the application, a volume capacity 215, Read/Write 216 representing read/write frequency from and to the volume set by the policy of the user and the application (for financial system, for various management businesses of companies, for database, etc), performance 217 representing a read/write speed of the volume, reliability 218 representing reliability of the volume in terms of a numerical value, and pairing possible/impossible information 219 representing whether or not the volume can be set as the volume that can be paired as the replication source with volume of the replication destination.

The storage ID 212 is an identifier of each storage 11a, 11b, ..., 11n. The storage volume ID 213 is an identifier of each volume 113a, 113, ..., 113n. Values of from 0 to 10 are entered as Read/Write information 216. In the case of the value 1, the policy is limited to only Read. As the value increases from 2, frequency of Write becomes higher. In the case of 10, the policy is limited to only Write. Values acquired by normalizing performance such as a read/write speed, etc between 1 and 10, that is, values of from 1 to 10, are entered to the performance information 217 representing performance of the volume. In the case of the value 1, access performance to the volume is the lowest and in the case of 10, access performance reaches maximum. Reliability information 218 representing reliability of the volume in terms of a numerical value is acquired by normalizing reliability between 1 and 10, that is, values from 1 to 10, are entered. The value 1 represents the highest degree of fault occurrence of the volume and the value 10 represents the lowest degree of fault occurrence. When setting is made in only the RAID level, for example, the managing computer 100 decides a rule such that the volume of RAID0 is 1, RAID1 is 10, RAID5 is 5, and so forth, and executes the management operation. In other words, Read/Write information 216, performance information 217 and reliability information 218 represent the properties of the corresponding volume.

The storage information table 220 stores information representing each of the storage ID 221 as the identifier of the storage managed by the managing computer 100, a space capacity 222 representing the capacity of a space area in the storage does not yet set and use as the volume, policy 223 to be given to the storage, maximum reliability 224 that can be achieved when the storage generates the volume by use of the space area and maximum performance 225 that can be achieved when the storage generates the volume by use of the space area.

In the case of the storage 11a, for example, the value of the space capacity 222 represents the capacity of the space area 114. When the storage ID 221 has the same value as the value of the storage ID 212 of the volume information table 210, it represents the same storage.

The pair information table 230 represents information of replication of the volumes the managing computer 100 manages. This table includes information of each of a pair ID 231 for identifying pair information, a main volume ID 232 representing a volume ID of the volume of the replication source, a sub-volume ID 233 representing a volume ID of the volume of the replication destination and a replication type 234 representing a replication type.

The value of the main volume ID 232 and the value of the sub-volume 233 represent the same volume when the values of the volume ID in the volume information table 210 are the same. A value "synchronous" or a value "asynchronous" is entered to the replication type 234. In the case of "synchronous", replication to the volume of the replication destination is made when write occurs in the volume of the replication source. In the case of "asynchronous", replication is made in a unit of a certain schedule (every predetermined time, data quantity per replication). The user or the application may set this replication type. Alternatively, the replication type may be set as a part of the processing of the volume management module that will be explained next.

FIG. 3 is a flowchart useful for explaining a processing operation for setting replication of the volume in accordance with the policy of the volume of the replication source and then generating the pair of the volume of the replication source and the volume of the replication destination. Next, this flowchart will be explained. The volume management module 105 executes the processing that will be explained with reference to this flowchart.

(1) First, the volume management module 105 acquires the pair generation request of the volume to be replicated with the ID of the volume of the replication source from the user and the application (Step 300).

At this time, the volume management module 105 may start executing the processing of Step 300 after the volume of the replication source is generated but before it receives the ID of the volume. In other words, when receiving the replication generation request, the volume management module 105 may create the volume of the replication source and the volume of the replication destination during a series of processing and may execute a plurality of settings. Alternatively, the volume management module 105 may acquire a request that the replication is created by use of the volumes inside the storage or the volumes between the storages.

(2) Next, information of the policy 223 of the storage is retrieved on the basis of the storage ID, and whether or not the storage having a volume capable of forming the pair with the volume of the replication source exists is judged. When the storage has the policy not capable of creating the volume as the replication source, the flow shifts to Step 308 and if not, to Step 302 (Step 301).

When the request for setting replication of the volumes exists between the storages in Step 301 and when all the storages other than the storage to which the volume of the replication source belongs, that is, all the storages other than the storage to which the volume of the replication source registered to the storage information table 200, have registered their policy to the limited policy of "for main storage"

that generates only the volume of the replication source to the policy 223 as typified by the storage of the storage ID3 in the storage information table in FIG. 2, the flow proceeds to Step 308 to notify that the storage capable of forming the volume of the replication destination does not exist. The flow may proceed to next Step 302 when the storage information table 220 does not manage the information of policy 223.

(3) When the storage capable of forming the pair is found existing in the volume as a result of judgment in Step 301, whether or not that storage has the policy of forming the pair is judged. In other words, when the volumes having the policy not capable of becoming the volume of the replication destination other than the volumes belonging to the storage having the policy not capable of forming the volume of the replication destination are retrieved and when all the volumes so retrieved cannot become the volume of the replication destination, the flow proceeds to Step 305 and if not, the flow proceeds to Step 303 (Step 302).

In Step 302, when the request for setting replication of the volume exists between the storages, for example, and when the volume of the replication destination cannot be designated in case all the policies of the volumes other than the storage to which the volume of the replication source belongs are "for replication source" as typified by the volume ID 1 in the volume information table 210, the volume of the replication source cannot be designated and the flow therefore proceeds to Step 305. If not, the flow proceeds to Step 303. When replication of the volume is set inside the storage, the volume of the replication destination cannot be designated if all the policies of the volumes of the storage to which the volume of the replication source belongs are "for main volume". Therefore, the flow proceeds to Step 305 and to Step 303 when the policy is not "for main volume".

(4) When the storage is found having the policy of forming the pair in the judgment of Step 302, whether or not the volume capable of forming the pair exists is judged. In other words, the volumes that cannot be used at present as the replication destination other than the volumes that cannot form the volume of the replication destination are retrieved on the basis of information of pairing impossible/impossible 219. When the object volumes all have the information "impossible" in the pairing possible/impossible information 219 as represented by the volume ID2 of the volume information table, the existing volumes managed by the managing computer cannot accomplish the replication destination. Therefore, the flow proceeds to Step 305, and to Step 304 when they can (Step 303).

(5) When the volume capable of forming the pair is found existing in the judgment of Step 303, whether or not the properties accessorial to the volume, that is, the values of capacity 215, Read/Write 216, performance 217 and reliability 218 of the volume information table 210 are coincident are checked. The flow proceeds to Step 307 when the coincident volume exists and to Step 305 when not. The term "coincidence" hereby used means in principle that the values are the same. Even when the volume having properties coincident with these properties does not exist, a volume having the property values approximate to these values may be used depending on the operation principle. As to the values of capacity 215, performance 217 and reliability 218 described above, the values of the replication destination may be the same or greater. For example, when the volume having a value 3 as the value of the volume ID 211 of the volume information table 210 is designated as the volume of the replication source during the processing of Steps 300 to 304, it becomes possible to set the volume having a value 6 of the volume ID 211 of the volume information table 210 to the volume of the replication destination. In other words, it is possible to set the volume having properties that are the same as or greater than the properties accessorial to the replication source to the volume of the replication destination (Step 304).

(6) When a volume coincident with the properties accessorial to the volume described above is not found in the judgment of Step 304, it means that no corresponding volume as the volume of the replication destination exists among the existing volumes managed in the volume information table. Therefore, whether or not this corresponding volume can be generated from the space area of the storage is judged. In other words, whether or not the volume coincident with the properties of the volume of the replication source can be generated is checked from the storage information table 220 with the exception of the storages not having the space area, and whether or not the volume coincident with the volume of the replication source can be generated is checked from capacity 222, reliability 224 and maximum performance 225 inside the storage information table 220. When it can, the flow proceeds to Step 306 and when it cannot, the flow proceeds to Step 308. When the volume having the volume ID 211 value of 7 in the volume information table 210 is designated as the volume of the replication source, for example, other volumes cannot be set as the volume of the replication destination in case that the properties are judged as non-coincident and designation of the volume is judged as impossible in Step 304. Therefore, this processing judges whether or not a volume of the replication source can be generated afresh from the space area is judged. At this time, it is possible to know from the information of the storage information table 220 that the volume of the replication destination can be achieved from the storage of the storage ID4 (Step 305).

(7) When the judgment result of Step 305 represents that the corresponding volume can be generated from the space area, the instruction is given to the controller of the storage to generate the volume of the replication destination coincident with the volume of the replication source, and the volume management table 210 and the storage information table 220 are updated. The controller of the storage generates the volume in accordance with the instruction described above. When the volume of the volume ID7 is the replication source as in the example taken in Step 305, the volume having the properties coincident with those of the volume of the volume ID7 is generated from the storage of the storage ID4, and that volume is registered to the volume information table (Step 306).

(8) When the volume coincident with the volume of the replication source is found existing among the existing volumes after the processing of Step 306 or in the judgment of Step 304, the replication pair is generated for the storage of the replication source and the storage of the replication destination by use of the corresponding volume as the replication source, and the volume of the replication source and the volume of the replication destination set afresh are registered to the pair information table 230. The processing is then finished (Step 307).

(9) When the storage capable of forming the pair is not found in the judgment of Step 301 or when the judgment result of Step 305 represents that the corresponding volume cannot be generate from the space area, the effect that the pair cannot be set with volumes of the replication destination indicated by the information 219 representing whether or not the volume can be set as the volume of the replication destination of the volume information table is indicated, and the processing is finished (Step 308).

When the processing of Step 307 described above is the processing for the volume in which the value of Read/Write 216 of the properties of the volume is only Read, a subsequent replication operation does not exist once replication is made. Therefore, a report may be given to notify that setting of replication is released after replication is finished once. In the case of replication of the volume in which Read occupies the major proportion, replication does not occur so frequently. Therefore, this property may be notified to the user as the factor for making the asynchronous replication schedule. The change of the asynchronous schedule may be urged to the user depending on the policy of the volume and on the load of replication.

Because the processing of Step 308 described above fails to provide the volume of the replication source, the report of the failure is made. In this case, a message may be outputted on the basis of the condition of the point of the occurrence of the failure. When Step 301 fails, for example, a message to the effect that "storage capable of generating volume of replication destination does not exist" may be additionally outputted.

In the processing described above, the volume pair generation part 107 executes the processing of Steps 300 and 307, the volume generation part 106 executes the processing of Step 306 and the volume pair selection part 108 executes the processing of Steps 301 to 305 and 308.

This embodiment executes the processing described above and can generate the replication by setting the volume of the replication destination in accordance with the policy of the volume of the replication source and its properties.

When a request for generating a plurality of pairs exists in a series of processing described above, the processing explained with reference to FIG. 3 is executed either repeatedly or in parallel and setting of the pairs is executed so that all the designated pairs can be generated. When any error occurs during the generation process of the plurality of pairs and the processing of Step 308 is therefore executed, the pairs that have been set so far are omitted.

The judgment steps from Steps 302 to 304 in the series of the process steps described above are the sequence for finding out the storage of the replication destination from the existing volumes that have already been generated. The process steps of Steps 305 and 306 are the sequence for generating afresh the volume of the replication destination. However, it is possible to change the process steps in such a fashion that the processing of Steps 305 and 306 is executed after Step 301, and then the processing proceeds to Step 302 when Step 305 has the condition in which volume cannot be generated and to Step 308 when Step 305 has the condition in which the volume cannot be selected. When the volume cannot be selected in the sequence of Steps 302 to 304 after Step 301, it is also possible to change the processing in such a fashion that the processing proceeds to Step 308 and is then finished.

The processing described above may further be changed in such a fashion as to proceed to Step 305 after Step 301 and then to Step 308 when the volume cannot be generated, and to terminate the processing. Furthermore, the processing of Steps 302 to 304 and the processing of Steps 305 and 306 may be executed in parallel after Step 301, and the volume that can be set as the replication destination may be displayed on the screen of the managing computer for the submission to the user and to the application.

When the volume of the replication source and the volume of the replication destination are generated as the replication pair in Step 307 in the processing described above, the connection distance between the storage to which the volume of the replication source belongs and the storage to which the volume of the replication destination belongs may be added as a condition in accordance with the policy of the volume of the replication source and its properties. For example, when the policy of the volume of the replication source is "volume for which most important data must be secured at the time of accident", the volume having the greatest inter-storage distance is preferentially selected. Further, the site of the storage and its position of either one, or both, of the replication source and the replication destination may be used as a condition for generating the replication pair of the volumes of both replication source and destination. For example, when the policy of the volume of the replication source is "volume whose leak is inhibited by company rule or law", the generation of the replication pair is permitted only in a specific country, a specific city, a specific company and a specific department. The policy of such a volume may be stored in and managed by the volume information table 210.

FIG. 4 is a block diagram showing a construction of storage operation management system according to a second embodiment of the invention. When a plurality of connection methods for connecting storages exists in the volume replication operation between the storages, the second embodiment of the invention hereby explained executes replication in accordance with a condition of a route of a volume and its policy.

In the construction of the first storage operation management system of the invention shown in FIG. 1, the second embodiment shown in FIG. 4 employs a construction in which a route management module 401 and a later-appearing route management module table group managed by the path management module are added to the managing computer 100 of the first embodiment, a cache 415, 425, 435 is further added to each of the plurality of storages 11*a*, 11*b* and 11*c*, and switches A440 and B450 are disposed to mutually connect the storages 11*a*, 11*b* and 11*c*, and data networks 460 to 464 are further added. Incidentally, though FIG. 4 shows only three storages 11*a*, 11*b* and 11*c*, they are shown as the representatives of the storages 11*a*, 11*b*, . . . , 11*n* shown in FIG. 1. The switches A440 and B450 and the data networks 461 and 463 for connecting these switches may use a public communication network.

The route management module 401 accomplishes the processing in the second embodiment of the invention. The processing is accomplished as software stored inside the storage device 104 of the managing computer 100 is read into the memory 101 and is executed by the CPU 102. The data route between the storages is accomplished through the switch A440, the switch B450 and the data networks 460 to 464. The data networks 460 to 464 are the cables in the same way as the network 130 shown in FIG. 1. The storage 11*a*, for example, can be connected to the storage 11*b* through the data network 460, the switch A440, the data network 461, the switch B450 and the data network 462. The storage 11*a* can also be connected to the storage 11*b* through another route extending from the data network 460, the switch A440, the data network 463, the switch B450 to the data network 462 as a different route.

FIG. 5 is an explanatory view useful for explaining the table group that the route management module 401 manages. The route management module table group 500 managed by the route management module 401 includes a route information table 510 and a cache information table 520.

The route information table 510 is a table for managing information of the route of the data network used for replicating the volume. This table 510 includes a route ID 511 as an identifier representing the replication route between the storages, an actual route 512 by cable information such as a cable name as the network for generating the route, a condition 513 representing the condition of the route 513, an associated storage 514 representing the storage connected to the route, an associated pair 515 for identifying a replication pair of the volumes using the route and a policy 516 representing the properties of the route. The managing computer 100 acquires the condition of the route from the switches A and B, the storages, etc., and manages this route information table 510. Incidentally, information of the security level of the route may be stored in and managed by the route information table 510, and the policy 516 may store a concrete maximum transfer speed, etc, of the route instead of the conditions "high speed" and "low speed".

In the explanation described above, the route 512 represents the route between the storages to which the replication pair is set or which have the possibility of setting. In the case of the example shown in the drawing, a route having the route ID 1 is represented as the route that connects the storage 11*a* to the storage 11*b* through the data network 460, the switch A440, the data network 461, the switch B450 and the data network 462.

The condition 513 registers the condition as to whether or not each route operates normally. In this embodiment, the condition includes "normal" and "abnormal", and the condition in which the line does not operate normally is registered as "abnormal". When the load to the line becomes high and the line cannot satisfy the policy, the condition may also be changed to "abnormal". In this case, it is preferred that the route information table manages the value of the network load at which the policy cannot be satisfied.

When the values of the pair ID 231 of the pair information table 230 are the same, the value of the associated pair 515 presents the same volume replication pair.

The cache information table 520 is a table for managing a cache use ratio prepared for speeding up replication, that is, information of use capacity/maximum capacity, for each storage and stores the storage ID 521 and information of the cache use ratio 522 of each storage. The caches in this instance correspond to the caches 415, 425 and 435.

FIG. 6 is a flowchart useful for explaining the processing for generating the replication depending on the policy of the line for connecting the volumes when volume replication is made between the storages in the second embodiment of the invention. Next, this processing will be explained. The processing shown in this flowchart is the one that is contained in the volume management module 105 and in the route management module 401.

(1) First of all, the volume management module 105 acquires the generation request of the volume pair to be replicated from the user and from the application together with the ID of the volume of the replication source (Step 600).

At this time, the volume management module 105 may start processing Step 600 after the volume of the replication source is generated but before it receives the ID of the volume. In other words, when receiving the replication generation request, the volume management module 105 may generate the volume of the replication source and the volume of the replication destination in a series of processing and may set replication. Alternatively, the volume management module 105 may acquire the request that the replication is created by use of the volumes inside the storages or the volumes between the storages.

(2) Next, the volume management module 105 retrieves information of the policy 223 of the volume of the replication source acquired in Step 600, and causes the route management module 401 to retrieve the policy of the line between the storage to which the volume of the replication source belongs and the volume that can be connected. Next, whether or not the line that can accomplish the policy of the volume of the replication source exists is judged. When the line having the policy capable of generating the volume of the replication destination exists, the flow proceeds to the processing of Step 602 and to Step 603 when such a line does not exist (Step 601).

When the generation request of the volumes exists between the storages and the volume of the replication source has the policy "Connection is to be made through high-speed line in replication of volumes" in the processing of Step 601, for example, the storage ID to which the volume of the replication source belongs is entered into the associated storage 514 of the route information table 510 of the line retrieved, and the route having the line that can be used as the "high-speed" policy is retrieved. When the corresponding line exists, the processing proceeds to Step 602 and when the corresponding line does not exist, to the processing of Step 603.

(3) When the corresponding line exists in the judgment of Step 601, the processing shifts to the processing of Step 301 and to the following Steps explained with reference to the flow of FIG. 3. In this case, the processing from Step 301 is executed for the associated storage acquired in Step 601 (Step 602).

(4) When the corresponding line is not found in the judgment of Step 601, the volume of the replication destination cannot be provided, and the report is made to this effect. In this case, a message may be out-putted on the basis of the condition of the occurrence point of the error. For example, a message "Line capable of generating volume of replication destination does not exist" may be additionally outputted.

When the processing described above is executed, the connectable line can be selected in accordance with the policy of the line and with the policy of the volume designated as the replication source.

FIG. 7 is a flowchart useful for explaining the processing operation of fault shooting when any fault occurs in the replication route during the volume replication between the storages. Next, this operation will be explained. The route management module 401 executes this operation. However, the table of the table group 200 managed by the volume management module 105 is sometimes called out, and the volume management module 105 operates in this case.

(1) It will be assumed that the fault occurs in a plurality of routes during the volume replication operation between the storages and this route fault is detected. For example, it will be assumed that setting of replication exists with the volume 113*a* of the storage 11*a* in FIG. 4 being the replication source and the volume 123*a* of the storage 11*b* being the replication destination. When the replication type 234 of the pair information table 230 is "synchronous" and the Write request is raised for the volume 114*a*, or when the replication type 234 is "asynchronous" and the user or the application designates the start of replication, the controller of the storage start replication. When the controller of the storage or the switch A440 or B450 detects the fault of the route after the start of this replication, detection of the fault is notified to the managing computer 100 through the storage network communication equipment and the network, and the managing computer 100 receives the communication content (Step 700).

The route fault includes the case where the fault is notified from the storage or the switch and the case where the managing computer 100 periodically asks the fault of the storage or the switch. When the condition of the route having the value 1 of the route ID 511 is "abnormal" as shown in the route information table 510, for example, the managing computer 100 receives the route fault in Step 700.

(2) When the route fault is detected, whether or not another route should be searched for the volume 113a of the replication source failing replication is judged depending on the policy 213 of the volume ID211 corresponding to the volume 113a (Step 701).

When the search of another route is judged as necessary, the flow proceeds to Step 702 and when not, to Step 706. When the volume is the one having high importance in the policy 213 of the volume, for example, replication must be made quickly and the flow may proceed at this time to Step 702. When the policy of the volume is not particularly important, the flow may proceed to Step 706.

(3) When the judgment of Step 701 represents that another route must be searched, whether or not another route capable of reaching the same storage exists among the routes managed by the managing computer 100 is checked (Step 702).

At this time, the managing computer 100 may give an instruction to search data capable of being actually connected through the switch or the storage. Alternatively, it is possible to register in advance the storage route and to utilize this information. In this case, it is only necessary to register the set of the storages for each route as another attribute to the route management table 510. When the route exists and is not registered to the route management table 510, the route ID 511, the route 512, the condition 513, the associated storage 514 and the service 516 are registered. When the route exists, the flow proceeds to Step 703 and when not, to Step 706.

Incidentally, the policy 516 may be acquired from each switch, or the user or the application may set the policy 516. It will be assumed, for example, that the fault occurs in the route of the data network 461 in the route connecting the storage 11a and the storage 11b through the data network 460, the switch A440, the data network 461, the switch B450 and the data network 462 in the construction shown in FIG. 4, it is possible to set another route for connecting the storages 11a and 11b through the data network 460, the switch A440, the data network 463, the switch B450 and the data network 462.

(4) When the route exists in Step 702, the policy of the volume of the replication destination and the policy of the route are compared on the basis of the policy of the network and whether or not the policies are coincident is judged. When they are coincident, the flow proceeds to Step 704 and when not, to Step 706 (Step 703).

When the replication request of the volume of the replication destination is "high speed" and when the policy of the route is "low speed" in this case, for example, the requirement cannot be satisfied and the flow proceeds to Step 706. However, when there is the policy in which replication is more preferably continued even at the low line speed in accordance with the condition of fault, replication may be carried out by use of the low speed line. This request may be registered to the policy 213 of the volume information table, or the user or the application may give this request instruction as a part of the processing of Step 703.

(5) When the policies are found coincident in the judgment of Step 703, setting of the normal route is requested for the switches and the storages, and the volumes mutually confirm that the replication processing is possible. When a plurality of routes exists, a judgment may be made to automatically select one route in accordance with the policy, or the user or the application may be allowed to judge by providing a plurality of results (Step 704).

(6) Next, the managing computer gives the start instruction of replication to the storages by use of the route set in Step 704 (Step 705).

(7) When the judgment result proves NO in the judgment of Steps 701, 702 and 703, whether or not the replication data should be permanently stored in the cache is judged in accordance with the policy of the volume. In other words, when the use ratio of the cache is high as in the storage of the storage ID3 of the cache information table, overall efficiency of the policy will drop when the replication data of the failed volume having low policy is permanently stored. Therefore, judgment is made that such a replicated data be omitted. When the judgment result represents that the replication data should be permanently stored, the flow proceeds to Step 708. When not, the flow proceeds to Step 707 (Step 706).

(8) When the judgment result of Step 706 represents that the replication data should not be stored permanently in the cache, the managing computer 100 gives the instruction to the controller of the storage to omit the cache data of the volume to be omitted from the cache and to reduce the use ratio of the cache (Step 707).

(9) When the judgment result represents that the replication data should be permanently stored in the cache after the processing of Step 707 or in Step 706, the route fault is reported and the processing is finished (Step 708).

When a fault of replication occurs in the processing explained above, replication is sometimes made through a route different from the registered route. In this case, the processing capacity of the line of the route is sometimes affected depending on the other replication processing. Therefore, even when the policy of the route is "high speed", the invention checks whether or not the policy can be kept if a processing of replication increases. When the policy can be kept, the invention can set so as to execute a replication processing in which the fault occurs as another route.

As explained above, the second embodiment of the invention can judge whether or not replication should be made through another route when any fault occurs in a plurality of routes, or whether or not the content of the cache should be omitted depending on the policy of the volume, and can thus make efficient replication of the volumes.

FIG. 8 is a flowchart useful for explaining the processing operation for generating the replication pair in another storage when another route cannot be secured or when replication cannot be conducted even when the replication data is permanently stored in the cache. Next, this processing will be explained. The processing shown in this flowchart is the one that is contained in the volume management module 105 and the route management module 401. The processing explained hereby generates separately the replication pair of the volumes in replication of the volumes for which fault recovery cannot be made.

(1) In the pair after the fault occurs, whether or not fault recovery is impossible or a drastic delay occurs is judged. This judgment is made by setting a threshold value to the time from the occurrence of the volume fault to recovery of the fault of the route (Step 800).

(2) Next, whether or not the replication may be generated by use of other storages is judged from the policy 214 of the volumes of the volume information table 210. When the judgment result represents that other storages are not utilized, such as when the policy inhibits replication to other storages, the processing is as such finished without doing anything at all (Step 801).

(3) When the judgment result of Step 801 represents that setting of replication may well be set to other storages, the storages that can be registered as the volume replication route are searched, and whether or not such storages exist is judged (Step 802).

When the policy relating to the distance is set in this judgment, judgment may be made to the effect that the policy is contradictory even when the route can be registered. The flow proceeds to Step 803 when the storages having the route exist. The processing is finished when the route does not exist. When the route is under the condition represented by the route information table 510 and the condition of the route 1 is "abnormal", for example, the route 3 represents the route the condition of which is normal and which satisfies the policy.

(4) When the judgment result in Step 802 represents that the storage capable of setting the route exists, the pair is generated. This pair generation processing is the one that executes the flow explained with reference to FIG. 3. The pair generation processing is executed in accordance with the instruction that the processing should be executed within the range of the storages obtained by the processing of Step 802 (Step 803).

In the processing described above, the range management module 401 executes the processing of each Step 800, 801, 803 and the volume management module 105 executes the processing of Step 803.

By executing the processing described above, this embodiment stops once the replication processing when the fault occurs but can change setting of the pairs registered at present depending on the policy of the volumes, and can continue replication itself irrelevantly to the restoration speed of the route fault.

The processing of each embodiment of the invention described above can be constituted as a processing program. The processing program can be stored and provided in the form of storage media such as HD, DAT, FD, MO, DVD-ROM, CD-ROM, and so forth.

Figure 9:
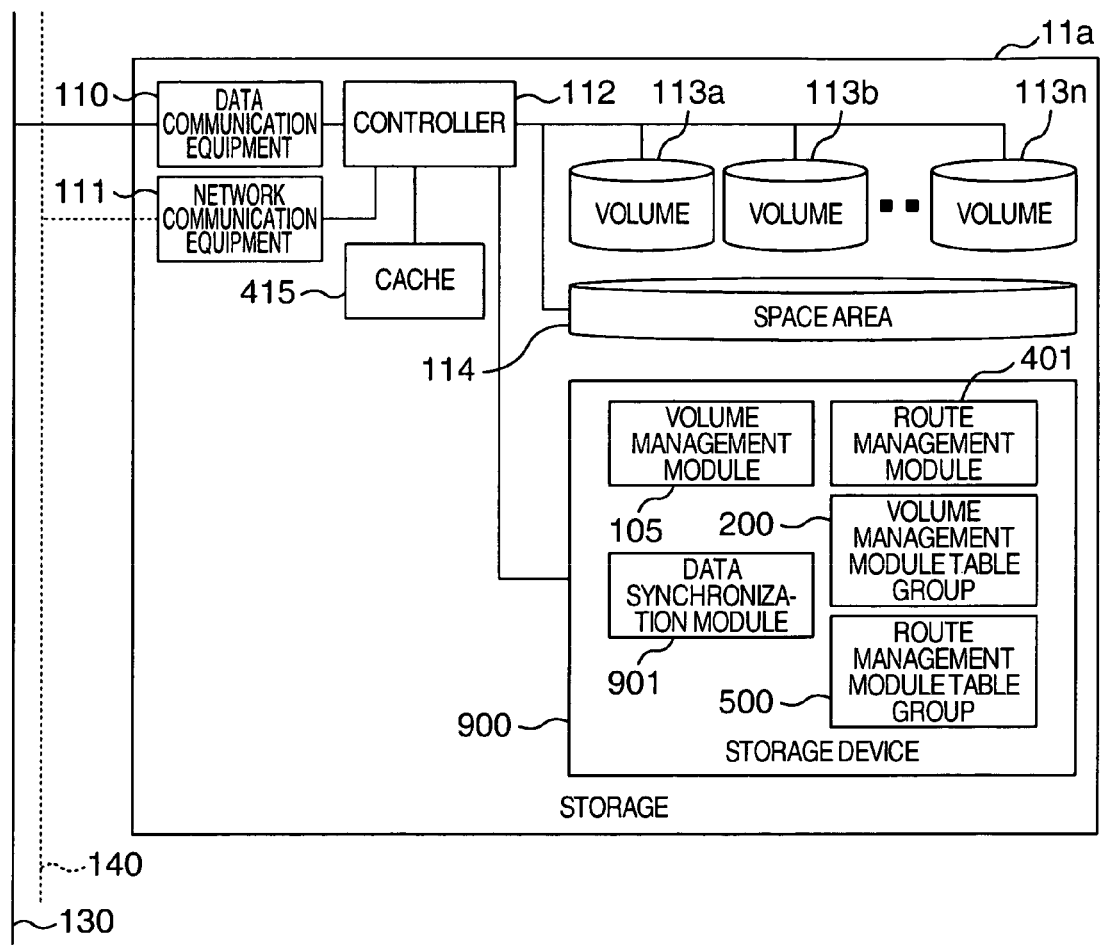
FIG. 9 is a block diagram showing a construction of a storage operation management system according to a third embodiment of the invention.

FIG. 9 is a block diagram showing a construction of storage operation system according to a third embodiment of the invention. The third embodiment employs the construction in which the functions of the managing computer in the constructions of the first and second embodiments are disposed inside the storage.

The third embodiment of the invention shown in FIG. 9 represents an example where a processing part for executing management is disposed inside the storage 11a shown in FIG. 4, for example. The volume management module 105 and the route management module 401 existing in the storage device 104 of the managing computer 100 shown in FIG. 4 are disposed inside a storage device 900 of the storage 11a. The volume management module 105 and the route management module 401 are accomplished as software stored in the storage device 900 of the storage 11a is read and executed by the controller 112. A data synchronization module 901 is disposed so that mutual information is coincident while keeping data consistency with other storages. Data consistency is kept by use of the network communication equipment 111, etc.

The third embodiment of the invention having the construction described above can eliminate the managing computer 100 utilized in the first and second embodiments. The third embodiment uses the data synchronization module 901 from a plurality of managing computers 100 when the managing computers 100 are provided to a large-scale storage operation management system. Therefore, when one managing computer cannot keep information, the third embodiment makes it possible to share the data of the plurality of managing computers.

According to each embodiment of the invention described above, the volume pair management module 105 can generate a volume replication pair between or inside the storages in accordance with the policy of the volumes or properties, and can generate the volume replication pair on the basis of the policy of the volume.

In the volume replication operation, the route management module 401 and the volume management module 105 can classify fault shooting in accordance with the policy of the volume and can make fault shooting of volume replication depending on the policy of the volume.

As explained above, the invention can efficiently operate and manage replication of the data areas inside the same storage or between the storages in accordance with information of the data area of the storage.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A processor-readable storage medium embodying executable code of a storage operation management program for operating and managing replication of a volume inside a storage device or among a plurality of storage devices, the executable program code comprising:

code for receiving a request for a copy source volume based on information indicating a feature of said copy source volume;

code for one of creating and selecting said copy source volume based on said information;

code for receiving a request for a copy destination volume;

code for one of creating and selecting said copy destination volume to have said feature of said copy source volume, based on said request for a copy destination volume, based on a prestored relationship between said copy source volume and said information, and based on possible/impossible pairing information indicating that said copy destination volume has a pairing capability of forming a replication pair with said copy source volume to make possible the copying of contents of said copy source volume to said copy destination volume, said pairing information being specified by one of a user and an application; and code for copying the contents of said copy source volume to said copy destination volume.

2. A storage operation management program according to claim 1, which further includes:

code for judging whether a copy destination volume exists having said feature of said created or selected copy source volume, based on said request for a copy destination volume and based on said prestored relationship between said created or selected copy source volume and said information.

3. A storage operation management program according to claim 1, which further includes:
   code for retrieving a route capable of connecting a storage device having the created or selected copy source volume and a storage device having the created or selected copy destination volume; and
   code for acquiring information of said route and judging whether replication of data of the created or selected copy source volume to the data area of the created or selected copy destination volume is possible by use of said route based on said information of the created or selected copy source volume and based on said information of said route.

4. A storage operation management program according to claim 1, further comprising:
   code for acquiring information of a route for connecting a storage device having said created or selected copy source volume to a storage device having said created or selected copy destination volume; and
   code for judging whether connection of said route for connecting the created or selected copy source volume to the created or selected copy destination volume is made through a different route in response to said information of the created or selected copy source volume and information of a communication line forming the route.

5. A storage operation management program according to claim 4, further comprising:
   code for judging existence/absence of omission of data stored in a storage area in accordance with information of the created or selected copy source volume, the operation condition of the replication and the operation condition of the storage area.

6. A storage operation management program according to claim 1, further comprising:
   code for judging whether or not a different copy destination volume can be substituted for the created or selected copy destination volume.

7. A storage operation management program according to claim 1, further comprising code for selecting one of said plurality of storage devices from which to create or select said copy destination volume, said selected storage device being different from the storage device having said created or selected copy source volume;
   wherein said code for creating or selecting said copy destination volume, creates or selects said copy destination volume from said selected storage device.

8. A storage operation management program according to claim 1, further comprising code for performing a copy function from said created or selected copy source volume to said created or selected copy destination volume.

9. A storage operation management program according to claim 1, wherein said pairing information includes a use policy of said copy destination volume indicating that said copy destination volume is not constrained to be a copy source volume, and wherein said pairing information includes a pairing indicator indicating that said copy destination volume is a possible replication destination for pairing with said copy source volume.

10. A processor-readable storage medium embodying executable code of a storage operation management program for operating and managing replication of a volume inside a storage device or among a plurality of storage devices, wherein when executed, the executable program code causes a computer to perform a method comprising the steps of:
   receiving a request for a copy source volume based on information indicating a feature of said copy source volume;
   creating or selecting said copy source volume based on said information;
   receiving a request for a copy destination volume;
   creating or selecting said copy destination volume to have said feature of said copy source volume, based on said request for a copy destination volume, based on a prestored relationship between said copy source volume and said information, and based on possible/impossible pairing information indicating that said copy destination volume has a pairing capability of forming a replication pair with said copy source volume to make possible the copying of contents of said copy source volume to said copy destination volume, said pairing information being specified by one of a user and an application; and
   setting a route capable of connecting a storage device having the copy source volume and a storage device having the copy destination volume based on said feature of the copy source volume.

11. A storage operation management program according to claim 10, wherein the method further comprises the step of selecting one of said plurality of storage devices from which to create or select said copy destination volume, said selected storage device being different from the storage device having said created or selected copy source volume; and wherein said step of creating or selecting said copy destination volume, creates or selects said copy destination volume from said selected storage device.

12. A storage operation management program according to claim 10, wherein the method further comprises the step of performing a copy function from said created or selected copy source volume to said created or selected copy destination volume.

13. A storage operation management program according to claim 10, wherein the method further comprises the steps of:
   acquiring information of a route for connecting a storage device having said created or selected copy source volume to a storage device having said created or selected copy destination volume; and
   judging whether connection of said route for connecting the created or selected copy source volume to the created or selected copy destination volume is made through a different route in response to said information of the created or selected copy source volume and information of a communication line forming the route.

14. A storage operation management program according to claim 13, further comprising the step of judging existence/absence of omission of data stored in a storage area in accordance with information of the created or selected copy source volume, the operation condition of the replication and the operation condition of the storage area.

15. A storage operation management program according to claim 10, further comprising the step of judging whether or not a different copy destination volume can be substituted for the created or selected copy destination volume.

16. A storage operation management program according to claim 10, wherein said pairing information includes a use policy of said copy destination volume indicating that said copy destination volume is not constrained to be a copy source volume, and wherein said pairing information includes a pairing indicator indicating that said copy destination volume is a possible replication destination for pairing with said copy source volume.

17. A processor-readable storage medium embodying executable code of a storage operation management program for operating and managing replication of a volume inside a storage device or among a plurality of storage devices, wherein when executed, the executable program code causes a computer to perform a method comprising the steps of:

receiving a request for a copy source volume based on a feature of said copy source volume, and based on first pairing information indicating a use policy of said copy source volume and indicating that said copy source volume is capable of forming a replication pair with a copy destination volume;

creating or selecting said copy source volume based on said feature and said first pairing information;

receiving a request for a copy destination volume; and creating or selecting said copy destination volume to have said feature of said copy source volume based on said request for a copy destination volume, based on a prestored relationship among said copy source volume and said feature, and based on possible/impossible second pairing information indicating that said copy destination volume has a pairing capability of forming a replication pair with said copy source volume to make possible the copying of contents of said copy source volume to said copy destination volume, said second pairing information being specified by one of a user and an application.

18. A processor-readable storage medium embodying executable code of a storage operation management program for operating and managing replication of a volume inside a storage device or among a plurality of storage devices, wherein when executed, the executable program code causes a computer to perform a method comprising the steps of:

receiving a pair generation request for a copy source volume for which a volume identifier, a predefined use policy, and a pairing capability thereof are stored in a volume information table with a relationship to each other and to a storage capacity of the copy source volume, a read/write frequency predetermined for the copy source volume, a performance indicator for the copy source volume, and a reliability indicator of the copy source volume, wherein said pair generation request includes said volume identifier;

referring to a storage information table holding a relationship between a storage device and a storage policy;

determining, based on said step of referring to the storage information table, whether a storage device exists that has a storage policy of forming a pair with said copy source volume;

when it is determined that a storage device exists that has a storage policy of forming a pair with said copy source volume, determining from possible/impossible pairing information in the volume information table whether the storage device has a volume having a pairing capability to make possible the copying thereto of contents of said copy source volume;

when it is determined that the storage device has a volume that has a pairing capability, determining from the volume information table whether the volume that has said pairing capability has a storage capacity, a read/write frequency, a performance indicator, and a reliability indicator that at least approximate the storage capacity, read/write frequency, performance indicator, and reliability indicator of the copy source volume in the volume information table;

when the volume that has said pairing capability has a storage capacity, read/write frequency, performance indicator, and reliability indicator that at least approximate the storage capacity, read/write frequency, performance indicator, and reliability indicator related to the copy source volume in the volume information table, generating a pairing of said volume, as a copy destination volume, and said copy source volume; and copying the contents of said copy source volume to said copy destination volume;

when the volume that has said pairing capability does not have a storage capacity, read/write frequency, performance indicator, and reliability indicator that at least approximate the storage capacity, read/write frequency, performance indicator, and reliability indicator related to the copy source volume in the volume information table, referring to the storage information table additionally holding a relationship between said storage device and space capacity, reliability, and a maximum performance of said storage device;

judging whether the relationship between said storage device and space capacity, reliability, and maximum performance thereof in the storage information table indicates that said storage device has a space area from which a volume can be generated that has a storage capacity, read/write frequency, performance indicator, and reliability indicator that at least approximate the storage capacity, read/write frequency, performance indicator, and reliability indicator related to the copy source volume in the volume information table;

when the relationship between said storage device and space capacity, reliability, and maximum performance thereof indicates that said storage device has a space area from which a volume can be generated that has a storage capacity, read/write frequency, performance indicator, and reliability indicator that at least approximate the storage capacity, read/write frequency, performance indicator, and reliability indicator related to the copy source volume in the volume information table, generating a copy destination volume from the space area that has a storage capacity, read/write frequency, performance indicator, and reliability indicator that at least approximate the storage capacity, read/write frequency, performance indicator, and reliability indicator related to the copy source volume in the volume information table;

generating a pairing of said copy destination volume and said copy source volume; and copying the contents of said copy source volume to said copy destination volume.

* * * * *